T. L. TALIAFERRO.
METHOD OF FORMING SEALING RINGS FOR GLASS OR PORCELAIN COVERS.
APPLICATION FILED OCT. 23, 1912.

1,089,093.

Patented Mar. 3, 1914.

Witnesses

Inventor
Thomas Lucien Taliaferro
By Sturtevant Mason
Attorneys

United States Patent Office.

THOMAS LUCIEN TALIAFERRO, OF WHEELING, WEST VIRGINIA, ASSIGNOR, BY MESNE ASSIGNMENTS, TO PHOENIX HERMETIC COMPANY, OF NEW YORK, N. Y., A CORPORATION OF NEW YORK.

METHOD OF FORMING SEALING-RINGS FOR GLASS OR PORCELAIN COVERS.

1,089,093.  Specification of Letters Patent.  Patented Mar. 3, 1914.

Application filed October 23, 1912. Serial No. 727,469.

*To all whom it may concern:*

Be it known that I, THOMAS LUCIEN TALIAFERRO, a citizen of the United States, residing at Wheeling, in the county of Ohio, State of West Virginia, have invented certain new and useful Improvements in Methods of Forming Sealing-Rings for Glass or Porcelain Covers, of which the following is a description, reference being had to the accompanying drawing and to the figures of reference marked thereon.

The invention relates to new and useful improvements in the method of forming a sealing ring for a cover and more especially to the forming of a sealing ring for a porcelain or glass cover.

An object of the invention is to form a plastic sealing ring of uniform thickness, which is deposited upon and adheres to the seating edge of the cover.

Figure 1:
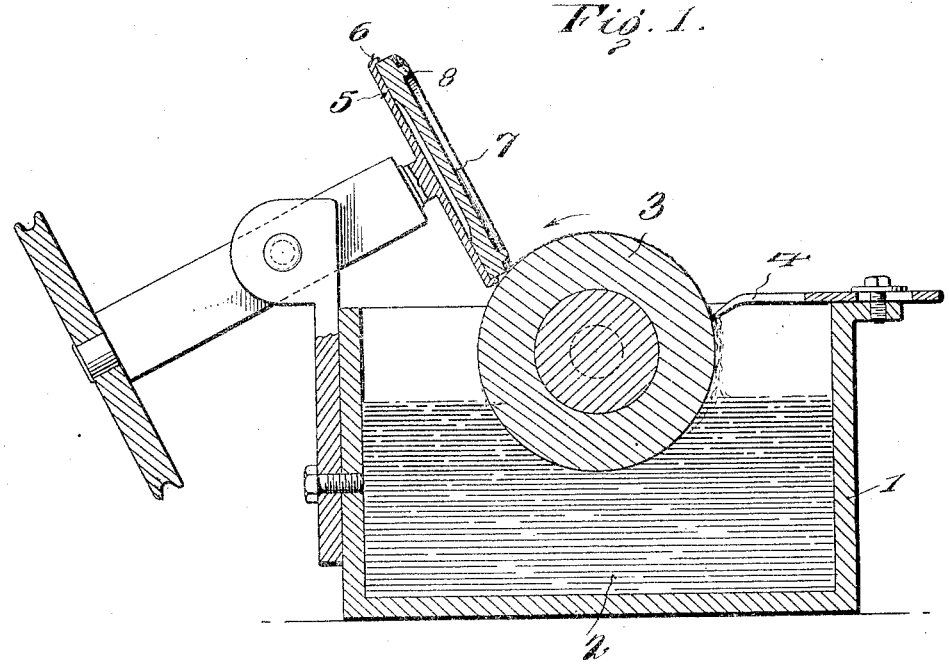
Figure 2:
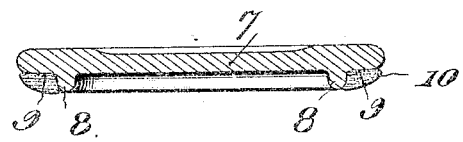
Figure 3:
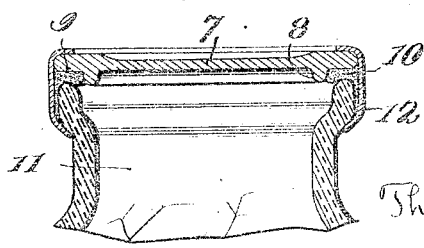

In the drawings:—Figure 1 is a sectional view through an apparatus which may be utilized for carrying out my improved method; Fig. 2 shows a cover having a plastic sealing ring applied thereto by my improved method; Fig. 3 shows the cover applied to a receptacle for closing the same.

My improved method consists generally in the constructing of a sealing ring for a glass or porcelain cover from a plastic sealing material, which is built up of layers of plastic sealing material deposited directly upon the cover until a ring of uniform thickness is produced.

While there are many ways by which my method may be carried out, I have illustrated in Fig. 1 of the drawing, one form of apparatus which may be utilized for this purpose, and the steps of the method will be made clear by a description of this apparatus.

The apparatus consists of a receptacle 1, in which a plastic sealing material 2 is placed. This plastic sealing material preferably includes a volatile solvent, whereby the plastic sealing material, when applied to the cover, will, through evaporation, become one solid plastic mass. It is obvious, however, that other solvents may be utilized in connection with my sealing material. Mounted to rotate in the receptacle 1, is a coating roll 3, which is so positioned that the lower surface thereof rotates in the plastic sealing material. Coöperating with the roll 3 is an evener or scraper 4, which removes the surplus sealing material from the coating roll so that a uniform layer of sealing material is carried along on the coating roll. Mounted on the receptacle 1 is a rotating chuck 5, having a flange 6 thereon, forming a seat for the cover 7. The cover 7 is preferably made of glass or porcelain and is provided with an annular rib 8 on its under face, forming an annular groove or seat 9, extending to the edge of the cover. This groove or seat 9 is adapted to receive the plastic sealing material, which is indicated at 10, in Figs. 2 and 3. The cover 7 is placed on the can body 11, so that the sealing material lies between the upper edge of the can body and the cover. A metal band 12 may be utilized for holding the cover on the can body.

The coating roll 3 moves in the direction of the arrow in Fig. 1, and the cover is held by the chuck, so that the lower edge thereof is practically in contact with the roll. As the coating roll turns, therefore, the sealing material will be scraped off on to the annular seat 9 of the cover. Inasmuch as the chuck 5 is rotating, the sealing material will be deposited in spiral layers on the cover. The thickness of these layers will depend upon the thickness of the coating on the coating roll, and the speed of travel of the chuck, relative to the travel of the coating roll. The thickness of the plastic ring built up of these spiral layers will depend upon the thickness of the layers and the time that said cover is rotated in contact with the coating roll.

The sealing material is adhesive in character, and will, therefore, stick to the coating roll. As a consequence, said coating material, as it is scraped from the roll, will be pressed or packed against the seat. While I have illustrated in Fig. 2 this plastic ring as formed of a plurality of layers, as a matter of fact, the plastic sealing material is so packed or pressed against the seat on the cover, and the layers applied thereto, that said ring becomes one solid mass or plastic material.

I am aware that prior to my invention, it has been a common practice to coat metallic covers by rotating a coating roll in contact with the surface to be coated. This roll, however, is so positioned that the cover moves in a plane substantially parallel with the axis of the roll, and the amount of the coating material applied to the cover depends upon the adhesive strength of the coating material. By my present method, however, the coating material is positively deposited on the part of the cover to be coated by the scraping of the material thereon. Furthermore, by this method, the material may be placed on the cover in relatively thick layers, so that a sealing ring of substantial thickness may be built up as distinguished from a mere thin coating layer, which is all that can be applied by the old form of coating method. I am also aware that it is old in the art to coat covers with a plastic material delivered thereto from a nozzle. In order to apply such a coating, the sealing material must be in liquid form and could not be built up in layers on the edge of a cover, such as shown and described above. Furthermore, where the coating material is applied to the cover in liquid form, the capillary attraction of the vertical flange on the usual type of cover would not permit a ring of sufficient thickness to be formed. Then again, when the sealing material is placed on the cover in liquid form, air bubbles or pockets often form between the glass and the lining solution, which, of course, are objectionable as they prevent the forming of a proper seal.

By my improved plastic sealing ring, the plastic material may be shaped to the upper edge of the body of the receptacle to which the cover is applied, and, as a matter of fact, when the cover is pressed on to the body by the clamping band, this sealing material will be forced down over the outer edge of the top of the receptacle and practically fills all the space between the band and the edge of the receptacle, as clearly shown in Fig. 3 of the drawings.

While I have referred to the plastic sealing ring throughout the description and claims as being of uniform thickness, I do not necessarily mean that said ring at its inner and outer edges is necessarily of the same thickness, but, rather, that various cross sectional areas of the ring throughout the entire circumference thereof are substantially the same.

Having thus described my invention, what I claim is:—

1. The method of forming a sealing ring on a cover, consisting in scraping the plastic sealing material on to the edge of the cover to be coated in spirally made layers of substantially uniform thickness.

2. The method of forming a plastic sealing ring on a cover, consisting in laying on the edge of the cover to be coated plastic sealing material by scraping the same thereon in spirally made layers, whereby a plastic coating of uniform thickness is formed.

In testimony whereof, I affix my signature, in the presence of two witnesses.

THOMAS LUCIEN TALIAFERRO.

Witnesses:
ALLAN KELLY,
A. L. METZNER.